(12) United States Patent
Park et al.

(10) Patent No.: US 7,256,861 B2
(45) Date of Patent: Aug. 14, 2007

(54) LIQUID CRYSTAL DISPLAY DEVICE

(75) Inventors: Sung Il Park, Daegu-kwangyeokshi (KR); Kwang Soon Park, Daegu-kwangyeokshi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 226 days.

(21) Appl. No.: 10/874,286

(22) Filed: Jun. 24, 2004

(65) Prior Publication Data

US 2004/0263770 A1 Dec. 30, 2004

(30) Foreign Application Priority Data

Jun. 24, 2003 (KR) ...................... 10-2003-0041121

(51) Int. Cl.
*G02F 1/1333* (2006.01)
(52) U.S. Cl. .................... 349/187; 349/48; 349/42; 349/43; 349/46; 345/173; 345/175
(58) Field of Classification Search ................ 349/42, 349/43, 46, 48; 345/92, 173, 175
See application file for complete search history.

(56) References Cited

U.S. PATENT DOCUMENTS

| | | | | |
|---|---|---|---|---|
| 5,408,252 A * | 4/1995 | Oki et al. | .................. | 345/205 |
| 6,191,831 B1 * | 2/2001 | Kim et al. | .................. | 349/43 |
| 6,999,134 B2 * | 2/2006 | Lee et al. | .................. | 349/38 |
| 2004/0135751 A1 * | 7/2004 | Kwon et al. | .................. | 345/87 |
| 2005/0041191 A1 * | 2/2005 | Lim | .................. | 349/152 |

* cited by examiner

*Primary Examiner*—David Nelms
*Assistant Examiner*—(Nancy) Thanh-Nhan P Nguyen
(74) *Attorney, Agent, or Firm*—Birch, Stewart, Kolasch & Birch, LLP

(57) ABSTRACT

A liquid crystal display device for minimizing the number of data lines and reducing a line resistance is disclosed. In the device, liquid crystal cells are provided at intersections between gate lines and data lines. At least one thin film transistor is provided at each liquid crystal cell to drive the liquid crystal cells. A source protrusion is provided at an ith horizontal line (wherein i is an integer) and is extended from any one of the thin film transistors. The source protrusion is connected, via at least one gate line, an other horizontal gate line excluding the ith horizontal line. A gate protrusion is extended from the other horizontal gate line in such a manner to be connected with the source protrusion.

24 Claims, 12 Drawing Sheets

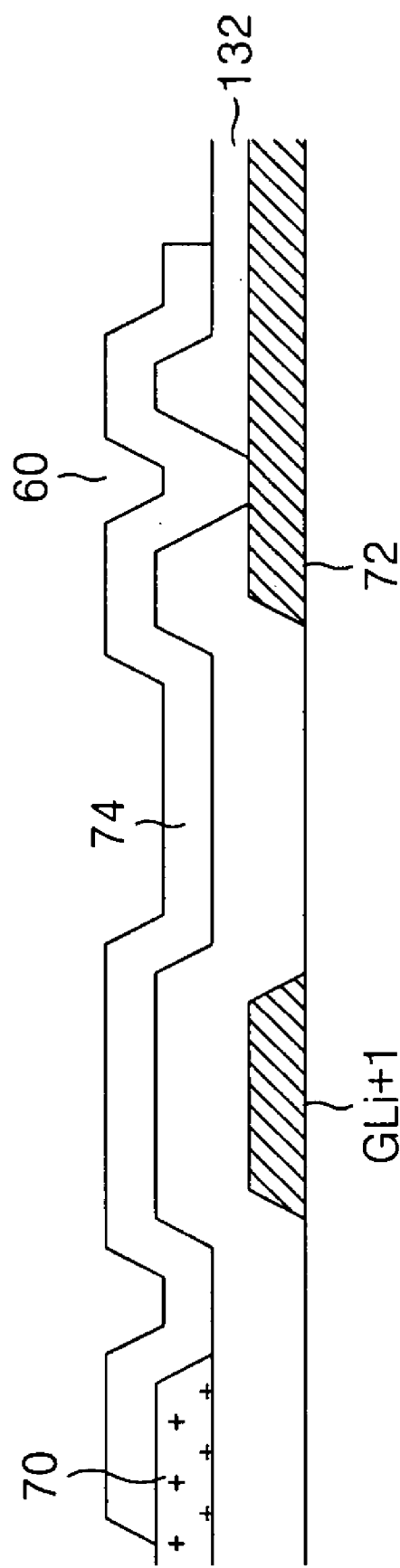

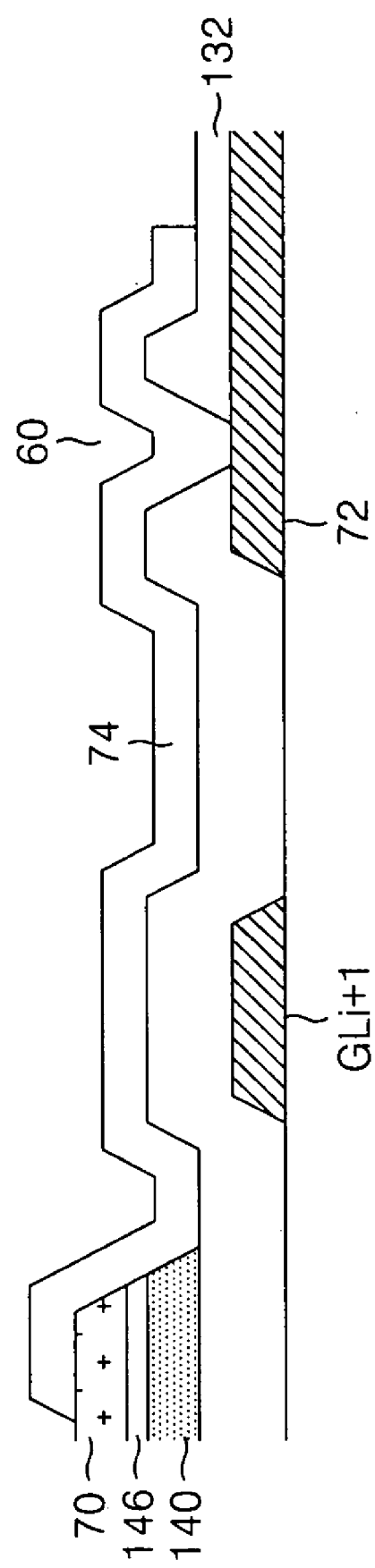

LIQUID CRYSTAL DISPLAY DEVICE

This application claims the benefit of the Korean Patent Application No. P2003-41121 filed in Korea on Jun. 24, 2003, the subject matter of which is hereby incorporated by reference.

BACKGROUND OF THE INVENTION

1. Field of the Invention

The present invention relates to a liquid crystal display, and more particularly to a liquid crystal display that is adaptive for minimizing the number of data lines as well as reducing a line resistance.

2. Description of the Related Art

Generally, a liquid crystal display (LCD) controls a light transmittance of a liquid crystal using an electric field to thereby display a picture. To this end, the LCD includes a liquid crystal display panel having a pixel matrix, and a driving circuit for driving the liquid crystal display panel. The driving circuit drives the pixel matrix such that picture information can be displayed on the display panel.

FIG. 1 shows a related liquid crystal display device.

Referring to FIG. 1, the related LCD includes a liquid crystal display panel 2, a data driver 4 for driving data lines DL1 to DLm of the liquid crystal display panel 2, and a gate driver 6 for driving gate lines GL1 to GLn of the liquid crystal display panel 2.

The liquid crystal display panel 2 is comprised of thin film transistors TFT each of which is provided at each intersection between the gate lines GL1 to GLn and the data lines DL1 to DLm, and liquid crystal cells connected to the thin film transistors TFT and arranged in a matrix type.

The gate driver 6 sequentially applies a gate signal to each gate line GL1 to GLn in response to a control signal from a timing controller (not shown). The data driver 4 converts data R, G and B from the timing controller into analog video signals to thereby apply video signals to the data lines DL1 to DLm when a gate signal is applied to each gate line GL1 to GLn.

The thin film transistor TFT applies a data from the data lines DL1 to DLm to the liquid crystal cell in response to a control signal from the gate lines GL1 to GLn. The liquid crystal cell can be equivalently expressed as a liquid crystal capacitor Clc because it is comprised of a common electrode opposed to each other with having a liquid crystal therebetween and a pixel electrode connected to the thin film transistor TFT. Such a liquid crystal cell includes a storage capacitor (not shown) connected to a pre-stage gate line in order to keep a data voltage charged in the liquid crystal capacitor Clc until the next data voltage is charged therein.

The liquid crystal cells of such a related LCD forms vertical lines equal to the number (i.e., m) of the data lines DL1 to DLm because they are provided at intersections between the gate lines GL1 to GLn and the data lines DL1 to DLm. In other words, the liquid crystal cells are arranged in a matrix type in such a manner to make m vertical lines and n horizontal lines.

The related LCD requires m data lines DL1 to DLm so as to drive the liquid crystal cells having m vertical lines. Therefore, the related LCD has a drawback in that a number of data lines DL1 to DLm should be provided to drive the liquid crystal display panel 2 and hence a process time and a manufacturing cost are increased. Furthermore, the related LCD has a problem in that, since a large number of data driving integrated circuits (IC's) are included in the data driver 4 so as to drive the m data lines DL1 to DLm, a large manufacture cost results.

SUMMARY OF THE INVENTION

Accordingly, it is an object of the present invention to provide a liquid crystal display that minimizes the number of data lines as well as reduces a line resistance.

In order to achieve these and other objects of the invention, a liquid crystal display device according to an embodiment of the present invention includes liquid crystal cells provided at intersections between gate lines and data lines; at least one thin film transistor provided at each liquid crystal cell to drive the liquid crystal cells; a source protrusion provided at an ith horizontal line (wherein i is an integer) and extending from a number of thin film transistors, said source protrusion being connected, across at least one gate line, to another gate line making an other horizontal line excluding the ith horizontal line; and a gate protrusion extending from the gate line making said other horizontal line in such a manner to be connected with the source protrusion.

In the liquid crystal display device, a source protrusion is formed from the same material as the source electrode and the drain electrode of its thin film transistor.

As disclosed herein, the source protrusions are formed from Cr or Mo.

The gate protrusions are formed from the same material as the gate electrode of their thin film transistors.

The gate protrusions are formed from AlNd.

The gate protrusions are extended from the gate line making the (i+2)th horizontal line.

The liquid crystal display device further includes a connector for electrically connecting a gate protrusion to a source protrusion.

As disclosed herein, a connector overlaps with the gate line making the (i+1)th horizontal line such that a length of a gate protrusion can be extended as large as possible.

The connectors are positioned at the (i+2)th horizontal line.

Herein, said connectors are located adjacent to the gate line making the (i+1)th horizontal line such that the length of the gate protrusions can extended as much as possible.

Alternatively, the connectors are formed from the same material as a pixel electrode provided at a liquid crystal cell.

As disclosed herein, the connectors are formed from any one of indium-tin-oxide(ITO), indium-zinc-oxide(IZO) and indium-tin-zinc-oxide(ITZO).

A gate protrusion is connected, via a contact hole, to a connector.

BRIEF DESCRIPTION OF THE DRAWINGS

These and other objects of the invention will be apparent from the following detailed description of the embodiments of the present invention with reference to the accompanying drawings, in which:

FIG. 8A and FIG. 8B are section views taken along the line VIII-VIII' in FIG. 7;

DETAILED DESCRIPTION OF THE PREFERRED EMBODIMENT

Figure 2:
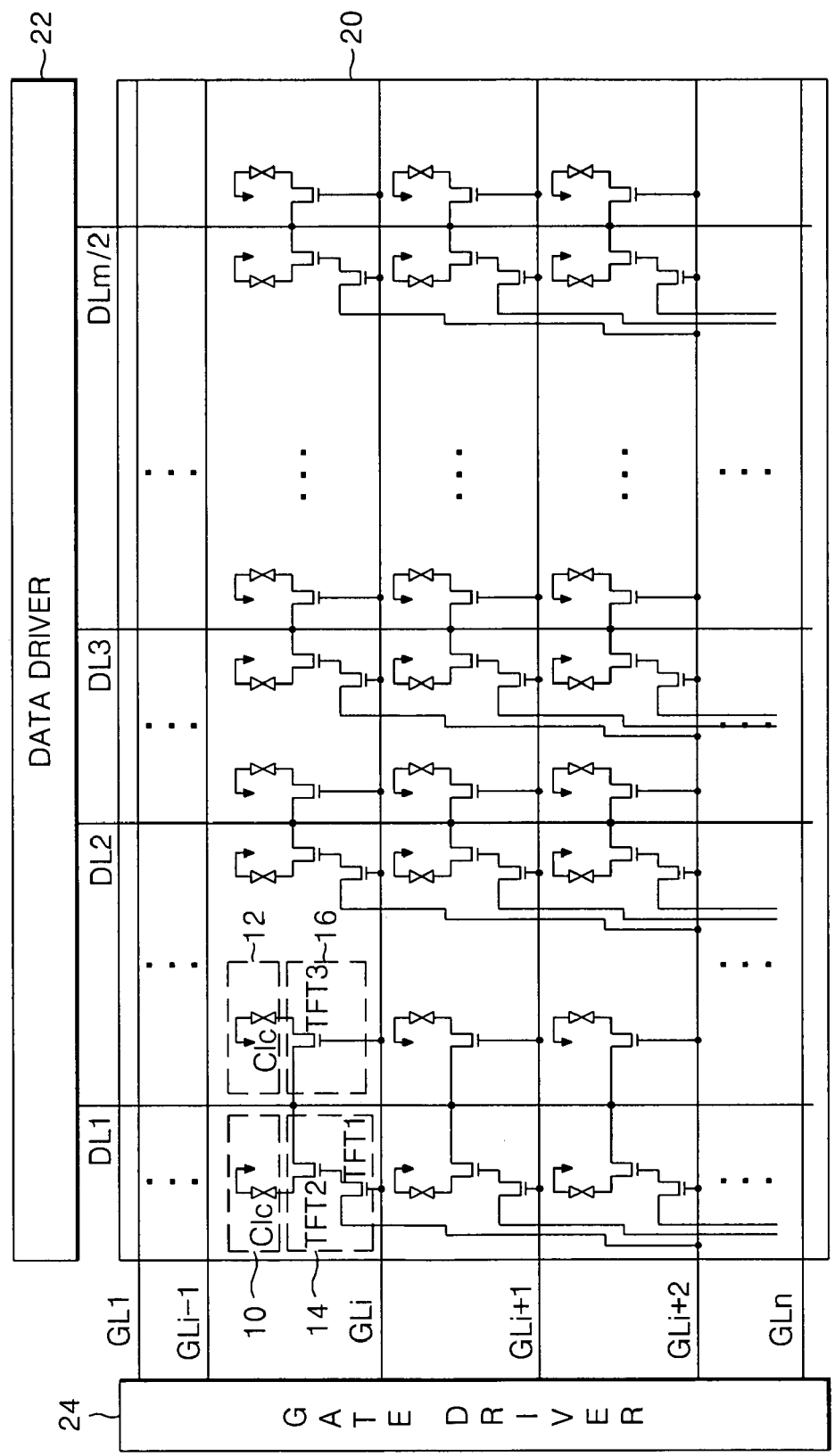
FIG. 2 is a block circuit diagram showing a configuration of a liquid crystal display according to an embodiment of the present invention.

FIG. 2 schematically shows a liquid crystal display (LCD) according to an exemplary embodiment of the present invention.

Referring to FIG. 2, the LCD includes a liquid crystal display panel 20, a data driver 22 for driving data lines DL1 to DLm/2 of the liquid crystal display panel 20, and a gate driver 24 for driving gate lines GL1 to GLn of the liquid crystal display panel 20.

The liquid crystal display panel 20 comprises first and second liquid crystal cells 10 and 12 provided at intersections between the gate lines GL1 to GLn and the data lines DL1 to DLm/2, a first switching part 14 provided at each first liquid crystal cell 10 to drive the first liquid crystal cell 10, and a second switching part 16 provided at each second liquid crystal cell 12 to drive the second liquid crystal cell 12. The first and second liquid crystal cells 10 and 12 can be equivalently expressed as a liquid crystal capacitor Clc because they comprise a common electrode opposed to each other with having a liquid crystal therebetween and a pixel electrode connected to each of the first and second switching parts 14 and 16. Herein, each of the first and second liquid crystal cells 10 and 12 includes a storage capacitor (not shown) connected to a pre-stage gate line in order to keep a data voltage charged in the liquid crystal capacitor Clc until the next data voltage is charged therein.

Figure 1:
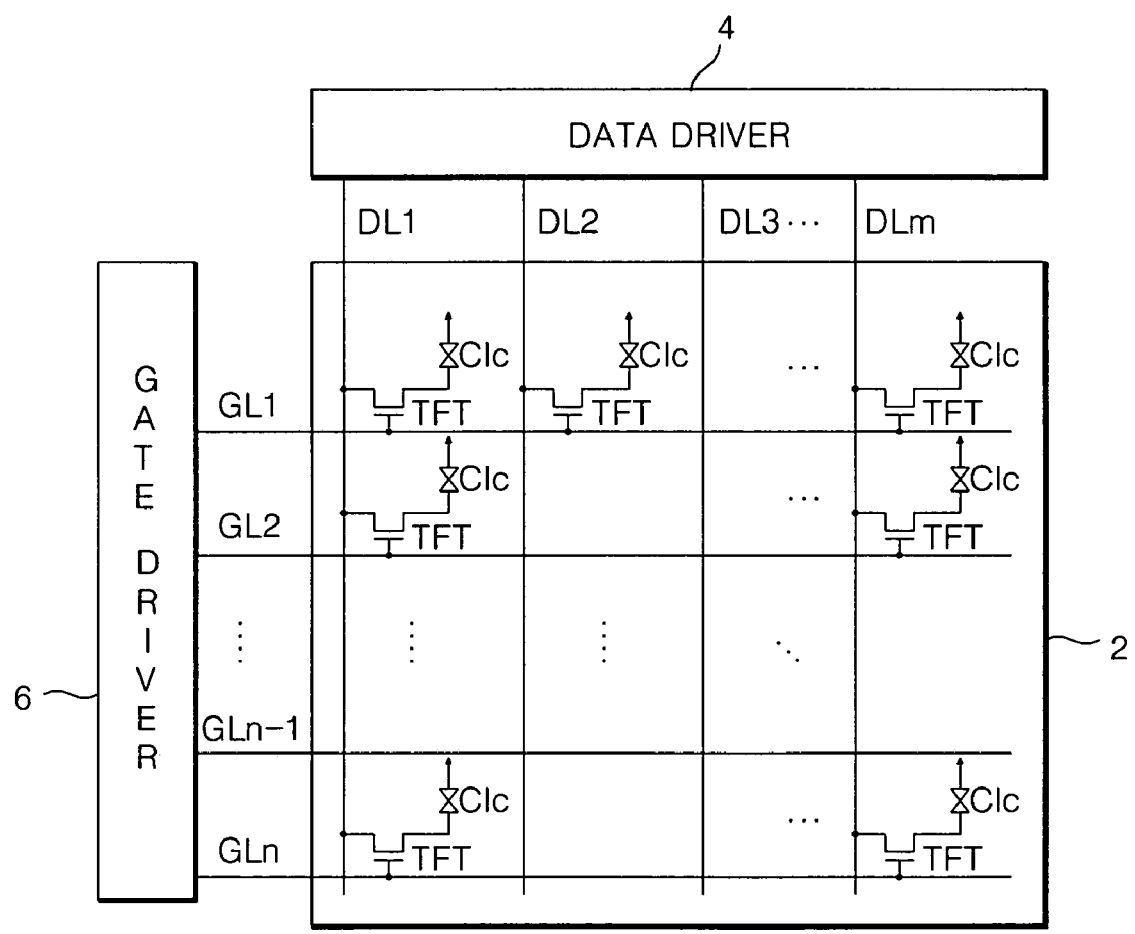
FIG. 1 is a block circuit diagram showing a configuration of a related liquid crystal display.

The first liquid crystal cell 10 and the first switching part 14 are provided at the left side of the data line DL, that is, at odd-numbered vertical lines. The second liquid crystal cell 12 and the second switching part 16 are provided, at the right side of the data line DL, that is, at even-numbered vertical lines. In other words, the first and second liquid crystal cells 10 and 12 are provided at the left/right sides having a single data line DL therebetween. In this case, the first and second liquid crystal cells 10 and 12 receive video signals from the data lines DL positioned adjacently to each other. Accordingly, the LCD according to the embodiment of the present invention allows the number of data lines DL to be reduced to a half of that in the related LCD shown in FIG. 1.

Figure 4:
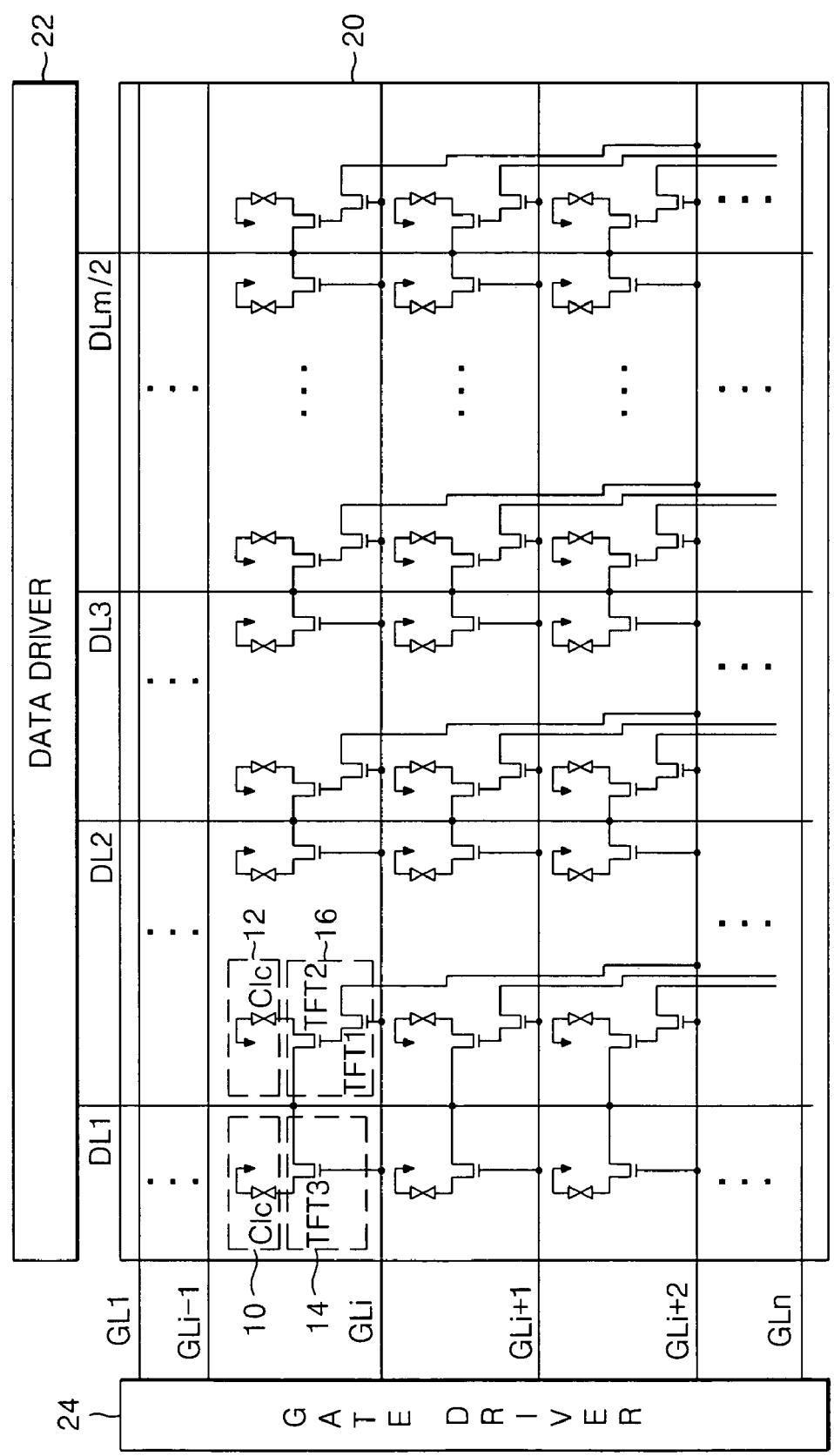
FIG. 4 is a block circuit diagram showing a configuration of a liquid crystal display according to another embodiment of the present invention.

Alternatively, in the present embodiment, a position of the first and second liquid crystal cells 10 and 12 may be changed as shown in FIG. 4. In other words, as shown in FIG. 4, the first liquid crystal cell 10 and the first switching part 14 may be provided at the right side of the data line DL while the second liquid crystal cell 12 and the second switching part 16 may be provided at the left side of the data line. In other words, the first liquid crystal cell 10 and the first switching part 14 may be provided at the even-numbered vertical lines while the second liquid crystal cell 12 and the second switching part 16 may be provided at the odd-numbered vertical lines.

The first switching part 14 for driving the first liquid crystal cell 10 positioned at the ith horizontal line (wherein i is an integer) includes first and second thin film transistors TFT1 and TFT2. The gate terminal of the first thin film transistor TFT1 is connected to the ith gate line GLi while the source terminal thereof is connected to the (i+2)th gate line GLi+2. The gate terminal of the second thin film transistor TFT2 is connected to the drain terminal of the first thin film transistor TFT1 while the source terminal thereof is connected to the adjacent data line DL. Further, the drain terminal of the second thin film transistor TFT2 is connected to the first liquid crystal cell 10. When a driving signal is applied to the ith gate line GLi and the (i+2)th gate line GLi+2, the first switching part 14 applies a video signal to the first liquid crystal cell 10.

The second switching part 16 for driving the second liquid crystal cell 12 positioned at the ith horizontal line includes a third thin film transistor TFT3. The gate terminal of the third thin film transistor TFT3 is connected to the ith gate line GLi while the source terminal thereof is connected to the adjacent data line DL. Further, the drain terminal of the third thin film transistor TFT3 is connected to the second liquid crystal cell 12. When a driving signal is applied to the ith gate line GLi, the second switching part 16 applies a video signal to the second liquid crystal cell 12.

The data driver 22 converts data R, G and B from a timing controller (not shown) into analog video signals to thereby apply them to the data lines DL1 to DLm/2. In this case, the LCD according to the embodiment of the present invention allows the number of data lines DL1 to DLm/2 to be reduced to a half of that in the related LCD shown in FIG. 1, so that the number of data driving IC's included in the data driver 22 also is reduced to a half.

Figure 3:
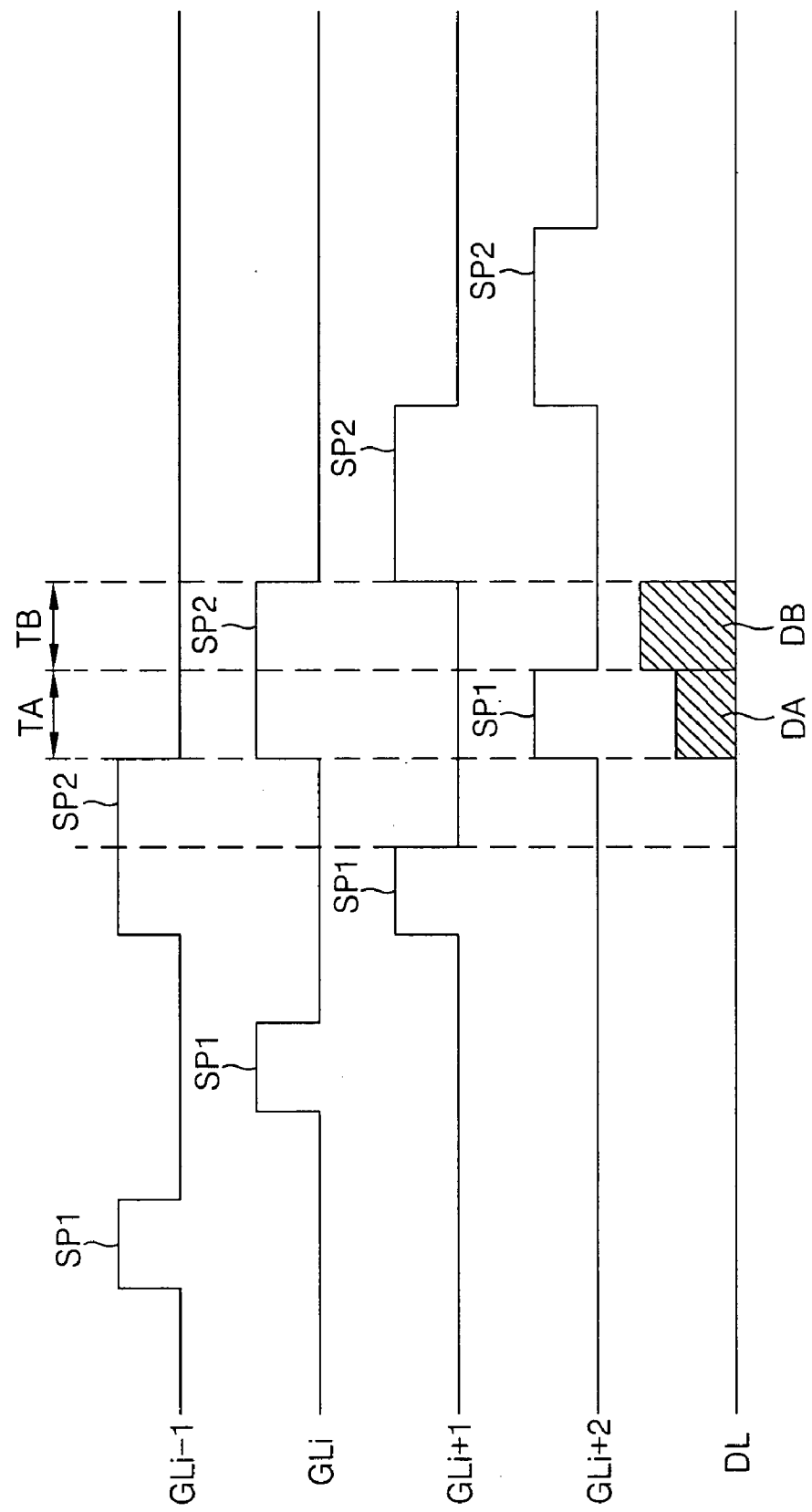
FIG. 3 is a waveform diagram of gate signals applied to the gate lines by the gate driver shown in FIG. 2.

The gate driver 24 sequentially applies first and second gate signals SP1 and SP2 to each gate line GL1 to GLn, as shown in FIG. 3, in response to a control signal from the timing controller (not shown). Herein, the second gate signal SP2 is set to have a larger width than the first gate signal SP1.

Meanwhile, the gate driver 24 applies the first and second gate signals SP1 and SP2 such that the second gate signal SP2 applied to the ith gate line GLi overlaps with the first gate signal SP1 applied to the (i+2)th gate line GLi+2 during a first period TA. In this case, since a width of the second gate signal SP2 is larger than that of the first gate signal SP1, the second gate signal SP2 does not overlap with the first gate signal SP1 in a second period TB following the first period TA.

In other words, the second gate signal SP2 applied to the ith gate-line GLi and the first gate signal SP1 applied to the (i+2)th gate line GLi+2 are provided simultaneously. Thus, during the first period TA, the second gate signal SP2 applied to the ith gate line GLi overlaps with the first gate signal SP1 applied to the (i+2)th gate line GLi+2. Thereafter, during the second period TB following the first period TA, the second gate signal SP2 only is applied to the ith gate line GLi.

A procedure in which video signals are applied to the liquid crystal cells 10 and 12 positioned at the ith horizontal line will be described below.

First, during the first period TA, the second gate signal SP2 is applied to the ith gate line GLi and, at the same time, the first gate signal SP1 is applied to the (i+2)th gate line GLi+2. The first gate signal SP1 applied to the (i+2)th gate line GLi+2 is applied to the source terminal of the first thin film transistor TFT1. At this time, since the second gate signal SP2 applied to the ith gate signal GLi turns on the first thin film transistor TFT1, the first gate signal SP1 applied to the source terminal of the first thin film transistor TFT1 is applied to the gate terminal of the second thin film transistor TFT2 to thereby turn on the second thin film transistor TFT2. As the second thin film transistor TFT2 is turned on, a first video signal DA applied to the data line DL is applied, via the second thin film transistor TFT2, to the first liquid crystal cell 10.

Subsequently, in the second period TB when the second gate signal SP2 only is applied to the ith gate line GLi, the third thin film transistor TFT3 is turned on. As the third thin film transistor TFT3 is turned on, a second video signal DB applied to the data line DL is applied, via the third thin film transistor TFT3, to the second liquid crystal cell 12.

Since the second liquid crystal cell 12 is substantially supplied with the second gate signal SP2 in the first period TA, it charges the first video signal DA during the first period TA. However, the second video signal DB is supplied during the second period TB following the first period TA, so that a desired video signal DB can be charged in the second liquid crystal cell 12.

Figure 5:
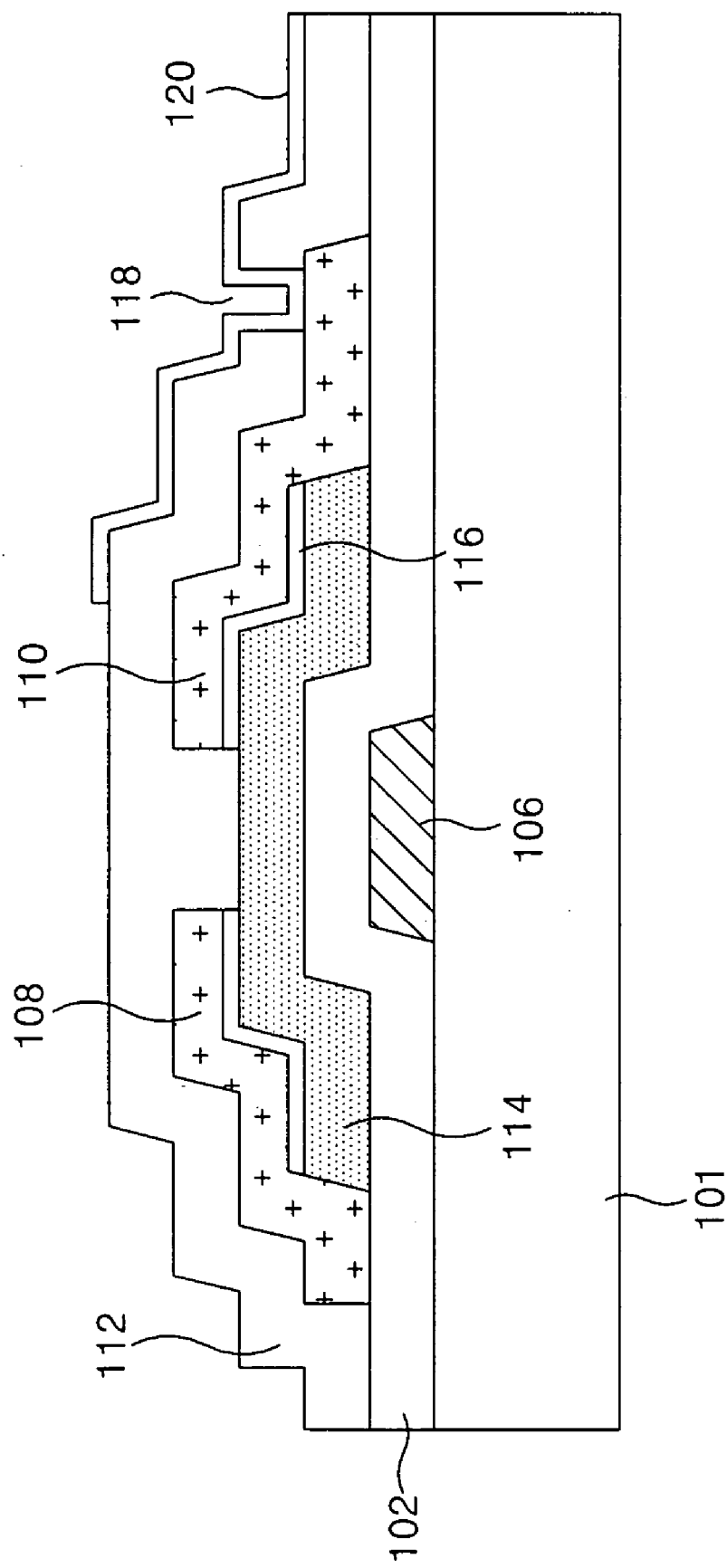
FIG. 5 and FIG. 6 are section views showing a structure of the thin film transistors shown in FIG. 2.

In the present embodiment, the thin film transistors TFT shown in FIG. 2 and FIG. 4 are formed as shown in FIG. 5.

Referring to FIG. 5, the thin film transistor TFT includes a gate electrode 106 provided on a lower substrate 101, and a source electrode 108 and a drain electrode 110 provided at a different layer from the gate electrode 106. Herein, the drain electrode 110 is formed in such a manner to be connected, via a drain contact hole 118, to a pixel electrode 120. In the case of TFT2 and TFT3, the drain electrode 110 is substantially connected to the pixel electrode 120 or the adjacent transistor TFT.

Semiconductor layers 114 and 116 for providing conduction channels are provided between the gate electrode 106, and the source electrode 108 and the drain electrode 110. The semiconductor layers 114 and 116 comprise an active layer 114, and an ohmic contact layer 116 provided between the active layer 114 and the source electrode 108 and between the active layer 114 and the drain electrode 110. The active layer 114 is formed from amorphous silicon being not doped with an impurity while the ohmic contact layer 116 is formed from amorphous silicon doped with an N-type or P-type impurity. Such semiconductor layers 114 and 116 apply a voltage supplied to the source electrode 108 to the drain electrode 110 when a voltage is supplied to the gate electrode 106. A gate insulating film 102 is provided between the gate electrode 106 and the semiconductor layers 114 and 116. A protective film 112 is provided on the source electrode 108 and the drain electrode 110.

The source electrode 108 and the drain electrode 110 of the thin film transistor TFT included in the embodiments of the present invention are formed by masks (i.e., 5-mask process) different from the semiconductor layers 114 and 116. Thus, the source electrode 108 and the drain electrode 110 have patterns different from the semiconductor layers 114 and 116. In FIG. 5, the gate electrode 106 is made from AlNd while the source electrode 108 and the drain electrode 110 are made from Cr. Accordingly, the gate electrode 106 has a lower resistance value than the source electrode 108 and the drain electrode 110.

Figure 6:
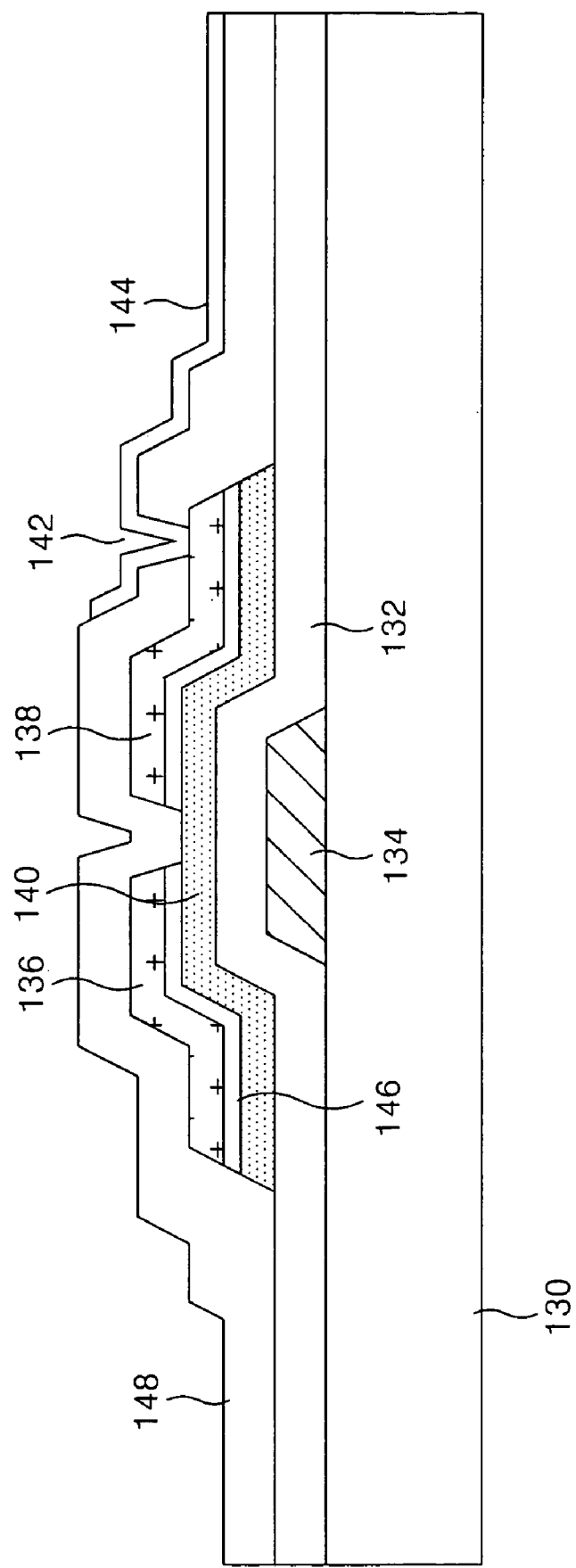

Alternatively, the thin film transistors TFT shown in FIG. 2 and FIG. 4 may be formed as shown in FIG. 6.

Referring to FIG. 6, the thin film transistor TFT includes a gate electrode 134 provided on a lower substrate 130, and a source electrode 136 and a drain electrode 138 provided at a different layer from the gate electrode 134. Herein, the drain electrode 138 is formed in such a manner to be connected, via a drain contact hole 142, to a pixel electrode 144. In the case of TFT2 and TFT3, the drain electrode 138 is substantially connected to the pixel electrode 144 or the adjacent transistor TFT.

Semiconductor layers 140 and 146 for providing conduction channels are provided between the gate electrode 134, and the source electrode 136 and the drain electrode 138. The semiconductor layers 140 and 146 comprise an active layer 140, and an ohmic contact layer 146 provided between the active layer 140 and the source electrode 136 and between the active layer 140 and the drain electrode 138. The active layer 140 is formed from amorphous silicon being not doped with an impurity while the ohmic contact layer 146 is formed from amorphous silicon doped with an N-type or P-type impurity. Such semiconductor layers 140 and 146 apply a voltage supplied to the source electrode 136 to the drain electrode 138 when a voltage is supplied to the gate electrode 134. A gate insulating film 132 is provided between the gate electrode 134 and the semiconductor layers 140 and 146. A protective film 148 is provided on the source electrode 136 and the drain electrode 138.

The source electrode 108 and the drain electrode 110 of the thin film transistor TFT included in the embodiments of the present invention are formed by masks (i.e., 4-mask process) different from the semiconductor layers 114 and 116. Thus, the source electrode 108 and the drain electrode 110 have patterns different from the semiconductor layers 114 and 116. In FIG. 5, the gate electrode 106 is made from AlNd while the source electrode 108 and the drain electrode 110 are made from Cr. Accordingly, the gate electrode 106 has a lower resistance value than the source electrode 108 and the drain electrode 110.

With reference to FIG. 4, the source terminal of the first thin film transistor TFT1 included in the first switching part 14 is connected, via at least one gate line GL, to the gate line GL provided at other horizontal line. In other words, the source terminal of the first thin film transistor TFT1 provided at the ith horizontal line is connected, via the ith and (i+1)th gate lines GLi and GLi+1, to the (i+2)th gate line GLi+2. Herein, the source terminal is connected to the gate line in a manner shown in FIG. 7.

Figure 7:
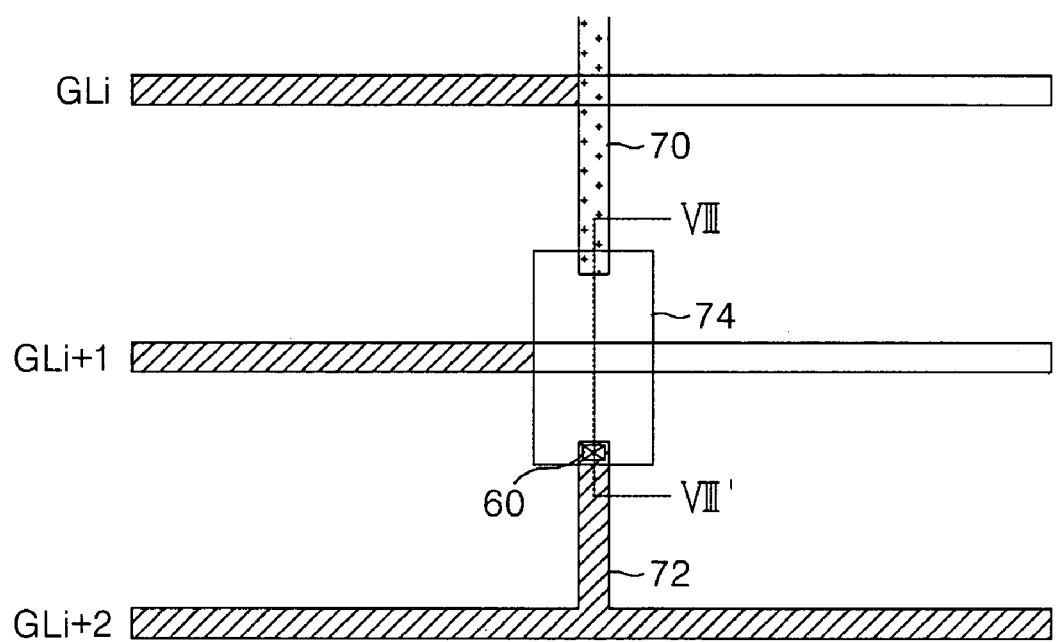
FIG. 7 depicts a first embodiment representing a connection procedure of a source protrusion with a gate protrusion.

Referring to FIG. 7, the source terminal of the first thin film transistor TFT1 provided at the ith horizontal line is connected, via at least one gate line GLi and GLi+1 (i.e., via an electrical insulation), to the gate line GLi+2 provided at other horizontal line. Herein, at the source terminal of the first thin film transistor TFT1, a source protrusion 70 is extended in such a manner to be electrically connected with the gate line GLi+2 provided at other horizontal line. At the gate line GLi+2 electrically connected to the source protrusion 70, a gate protrusion 72 is extended in such a manner to be connected with the source protrusion 70.

The gate line GL and the gate protrusion 72 are formed simultaneously with the gate electrodes 106 and 134. Thus, the gate line GL and the gate protrusion 72 are formed from AlNd having a low resistance. The source protrusion 70 and the source terminal of the first thin film transistor TFT1, which are connected to each other, are formed simultaneously with the source electrodes 108 and 136 and the drain electrodes 110 and 138. Thus, the source protrusion 70 is formed from Cr or Mo having a higher resistance than the gate line GL.

FIG. 8A is a section view showing a case where the lines are formed by the 5-mask process shown in FIG. 7.

In FIG. 7 and FIG. 8A, the source protrusion 70 extended from the source terminal of the first thin film transistor TFT1 positioned at the ith horizontal line and the gate protrusion 72 extended from the (i+2)th gate line GL are connected to each other through a connector 74. Herein, the connector 74 is formed simultaneously with the pixel electrode 120 and is formed from the same material as the pixel electrode 120, which is made from a transparent material such as indium-tin-oxide (ITO), indium-zinc-oxide (IZO) or indium-tin-zinc-oxide (ITZO), etc. The connector 74 is electrically connected with the source protrusion 70, and also is electrically connected, via a contact hole 60, to the gate protrusion 72. The connector 74 is located in such a manner to overlap with the (i+1)th gate line GLi+1. In other words, the connector 74 is located in such a manner to overlap with the (i+1)th gate line GLi+1, thereby electrically connecting the gate protrusion 72 extended from the (i+2)th gate line GLi+2 to the source protrusion 70 extended from the first thin film transistor TFT1. In this case, if the connector 74 is formed to overlap with the (i+1)th gate line GLi+1, then it becomes possible to set a length of the gate protrusion 72 as large as possible, and thus to reduce a line resistance.

On the other hand, when the lines are formed by the 4-mask process as shown in FIG. 6, they have sections as shown in FIG. 8B. In other words, since the source electrode 136 and the semiconductor layers 140 and 146 are formed by the same mask, the semiconductor layers 140 and 146 are located between the source protrusion 70 and an insulating film 132. Because the other configurations are identical to those in FIG. 8A, an explanation as to them will be omitted.

Figure 9:
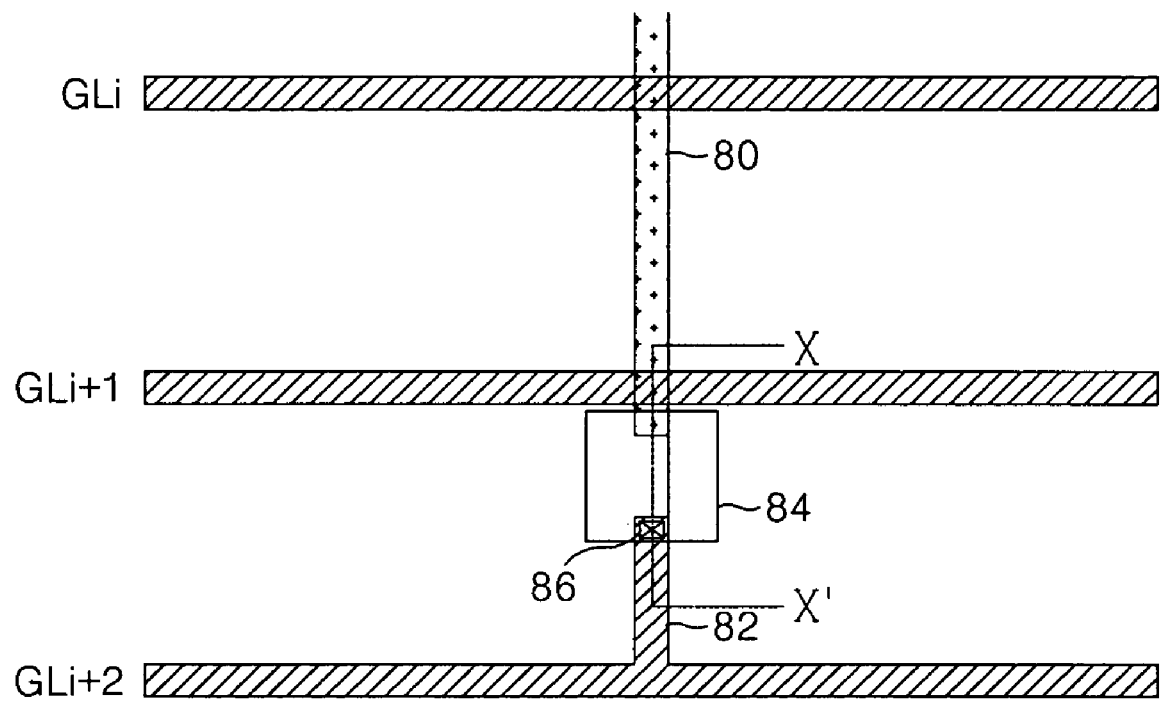
FIG. 9 depicts a second embodiment representing a connection procedure of a source protrusion with a gate protrusion.

FIG. 9 is another embodiment representing a connection procedure of the source terminal of the first thin film transistor TFT1 included in the first switching part 14 to the gate electrode GL provided at other horizontal line.

Referring to FIG. 9, the source terminal of the first thin film transistor TFT1 provided at the ith horizontal line is connected, via at least one gate line GLi and GLi+1 (i.e., via an electrical insulation), to the gate line GLi+2 provided at other horizontal line. Herein, at the source terminal of the first thin film transistor TFT1, a source protrusion 80 is extended in such a manner to be electrically connected with the gate line GLi+2 provided at other horizontal line. At the gate line GLi+2 electrically connected to the source protrusion 80, a gate protrusion 82 connected with the source protrusion 80 is extended.

The gate line GL and the gate protrusion 82 are formed simultaneously with the gate electrodes 106 and 134. Thus, the gate line GL and the gate protrusion 82 are formed from AlNd having a low resistance. The source protrusion 80 connected to the source terminal of the first thin film transistor TFT1 is formed from Cr or Mo having a higher resistance than the gate line GL.

Figure 10A:
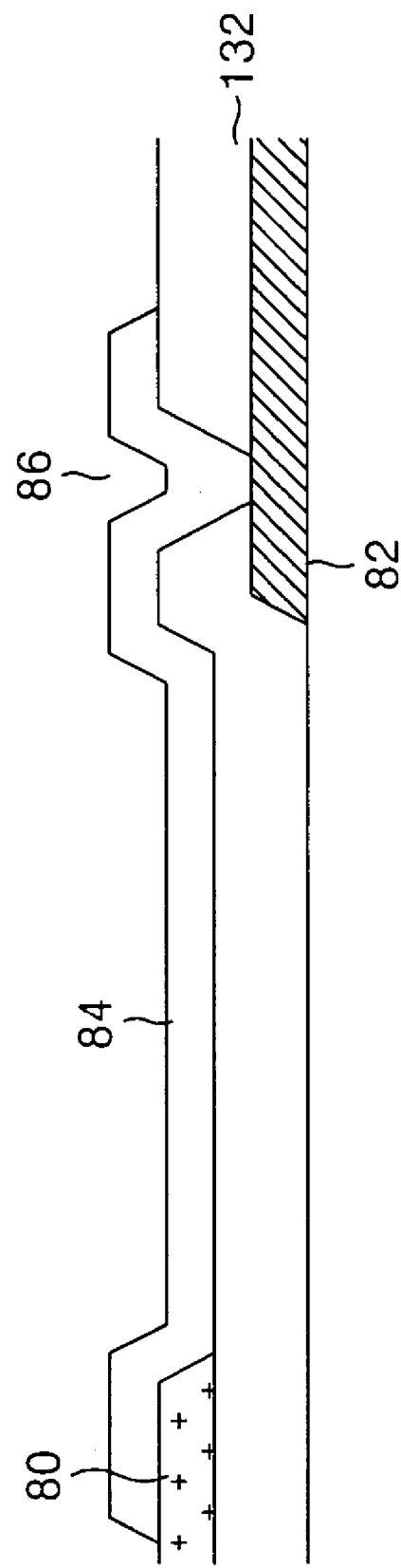
FIG. 10A and FIG. 10B are section views taken along the line X-X' in FIG. 9.

FIG. 10A is a section view showing a case where the lines are formed by the 5-mask process shown in FIG. 9.

In FIG. 9 and FIG. 10A, the source protrusion 80 extended from the source terminal of the first thin film transistor TFT1 positioned at the ith horizontal line and the gate protrusion 82 extended from the (i+2)th gate line GL are connected to each other through a connector 84. Herein, the connector 84 is located adjacently with the (i+1)th gate line GLi+1 such that a length of the gate protrusion 82 can be set largely. If the connector 84 is positioned adjacently with the (i+1)th gate line GLi+1, then the length of the gate protrusion 82 is set largely to thereby minimize a line resistance. In real, a position of the connector 84 can be freely set in the (i+2)th horizontal line.

The connector 84 is formed simultaneously with the pixel electrode 120, and is formed on the source protrusion 80 in such a manner to make an electrical contact with each other. The connector 84 is connected, via a contact hole 86, to the gate protrusion 82.

Figure 10B:
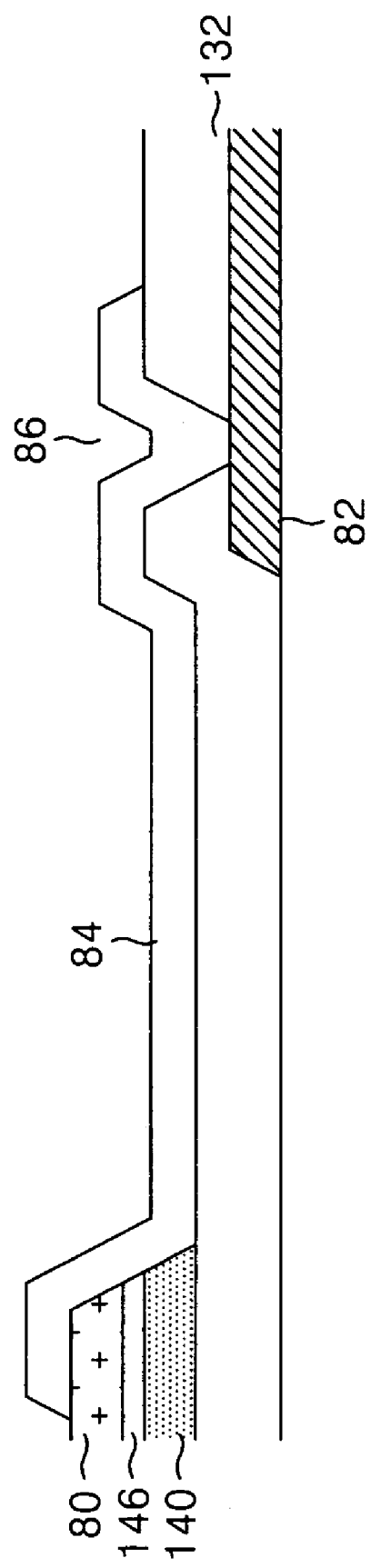

On the other hand, when the lines are formed by the 4-mask process as shown in FIG. 6, they have sections as shown in FIG. 10B. In other words, since the source electrode 136 and the semiconductor layers 140 and 146 are formed by the same mask, the semiconductor layers 140 and 146 are located between the source protrusion 80 and an insulating film 132. Because the other configurations are identical to those in FIG. 8A, an explanation as to them will be omitted.

As described above, the liquid crystal display according to the present invention drives liquid crystal cells positioned at the left/right sides of a single data line, thereby minimizing the number of data lines. Furthermore, the liquid crystal display according to the present invention extends a source protrusion from a thin film transistor located at a specific horizontal gate line and extends the gate protrusion from the gate of another thin film transistor positioned at an other horizontal gate line to thereby electrically connect that gate protrusion to that source protrusion, so that a gate signal can be supplied to the source terminal of the thin film transistor located at that specific horizontal gate line.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A liquid crystal display device having gate lines and data lines, comprising:
   liquid crystal cells provided at intersections between the gate lines and data lines;
   at least one thin film transistor provided at each liquid crystal cell to drive the liquid crystal cells;
   a source protrusion provided for a thin film transistor located at an ith horizontal line (where i is an integer) and extending from the thin film transistor, said source protrusion being connected, across at least one gate line, to a horizontal gate line other than the ith horizontal gate line; and
   a gate protrusion extending from a thin film transistor located at the horizontal gate line other than the ith horizontal gate line connectable with the source protrusion.

2. The liquid crystal display device according to claim 1, wherein said source protrusion is formed from the same material as the source electrode and the drain electrode of its thin film transistor.

3. The liquid crystal display device according to claim 2, wherein said source protrusion is formed from Cr or Mo.

4. The liquid crystal display device according to claim 1, wherein said gate protrusion is formed from the same material as the gate electrode of its thin film transistor.

5. The liquid crystal display device according to claim 4, wherein said gate protrusion is formed from AlNd.

6. The liquid crystal display device according to claim 1, wherein said gate protrusion is extended from the (i+2)th horizontal gate line.

7. The liquid crystal display device according to claim 6, further comprising:
   a connector for electrically connecting the gate protrusion to the source protrusion.

8. The liquid crystal display device according to claim 7, wherein said connector overlaps with the gate line making the (i+1)th horizontal line such that a length of the gate protrusion can be extended.

9. The liquid crystal display device according to claim 7, wherein said connector is positioned at the (i+2)th horizontal gate line.

10. The liquid crystal display device according to claim 9, wherein said connector is located adjacent to the (i+1)th horizontal gate line so that a length of the gate protrusion is relatively large.

11. The liquid crystal display device according to claim 7, further comprising a pixel electrode and;
   wherein said connector is formed from the same material as the pixel electrode.

12. The liquid crystal display device according to claim 11, wherein said connector is formed from any one of indium-tin-oxide(ITO), indium-zinc-oxide(IZO) and indium-tin-zinc-oxide(ITZO).

13. The liquid crystal display device according to claim 11, wherein said gate protrusion is connected, via a contact hole, to the connector.

14. A method of making a liquid crystal display device having gate lines and data lines, comprising:
   providing liquid crystal cells at intersections between gate lines and data lines;
   providing at least one thin film transistor at each liquid crystal cell to drive the liquid crystal cells;
   providing a source protrusion for a thin film transistor located at an ith horizontal line (where i is an integer) and extending from the thin film transistor, said source protrusion being connected, across at least one gate line, to a horizontal gate line other than the ith horizontal gate line; and
   providing a gate protrusion extending from a thin film transistor located at the horizontal gate line other than the ith horizontal gate line connectable with the source protrusion.

15. The method of claim 14, further comprising:
   forming said source protrusion from the same material as the source electrode and the drain electrode of its thin film transistor.

16. The method of claim 14 further comprising:
   forming said gate protrusion from the same material as the gate electrode of its thin film transistor.

17. The method of claim 14, further comprising:
   extending said gate protrusion from the (i+2)th horizontal gate line.

18. The method of claim 17, further comprising:
   forming an electrical connector electrically connecting the gate protrusion to the source protrusion.

19. The method of claim 17, further comprising:
   overlapping said connector with the gate line making the (i+1)th horizontal line such that a length of the gate protrusion can be extended.

20. The method of claim 18, further comprising:
   positioning said connector at the (i+2)th horizontal gate line.

21. The method of claim 18, further comprising:
   locating said connector adjacent to the (i+1)th horizontal gate line so that a length of the gate protrusion is relatively large.

22. The method of claim 18, further comprising:
   providing a pixel electrode and;
   forming said connector from the same material as the pixel electrode.

23. The method of claim 21, wherein:
   the electrical connector connecting the gate protrusion to the source protrusion comprises any one of indium-tin-oxide (ITO), indium-zinc-oxide (IZO) and indium-tin-zinc-oxide (ITZO).

24. The method of claim 21, further comprising:
   connecting the gate protrusion, via a contact hole, to the electrical connector.

* * * * *